May 17, 1938.  E. ROSSMAN  2,117,910
STEREOSCOPIC VIEWER AND PHOTOGRAPHIC FILM FOR SAME
Filed Aug. 10, 1935
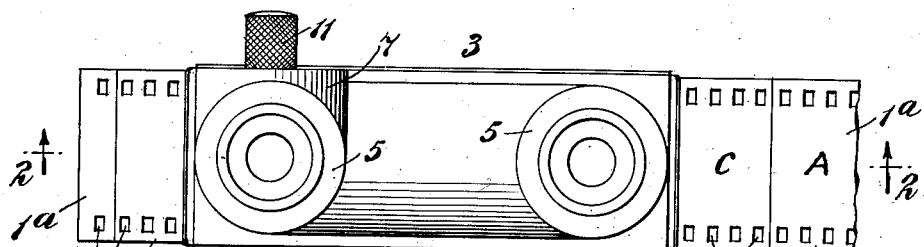
Fig. 1
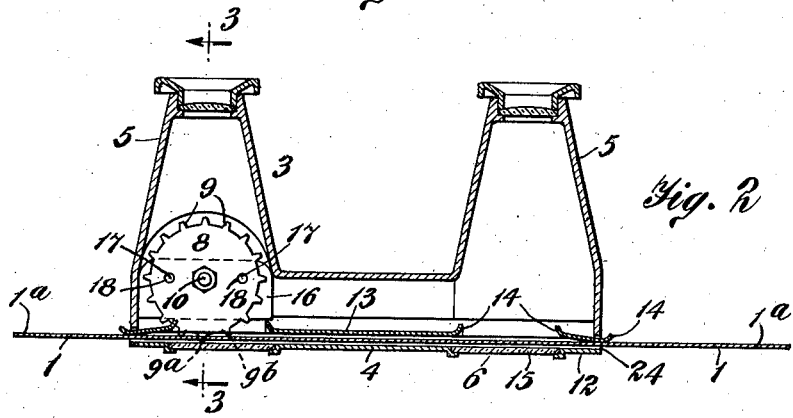
Fig. 2
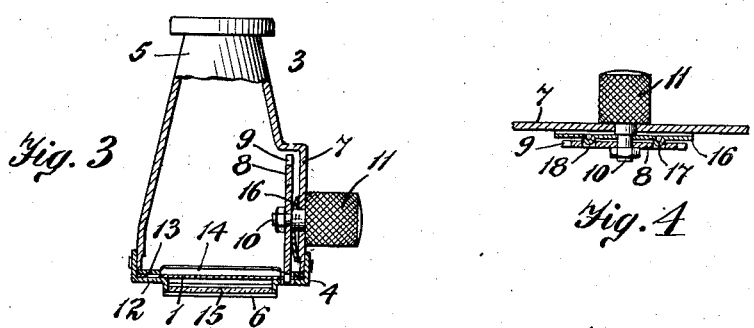
Fig. 3
Fig. 4
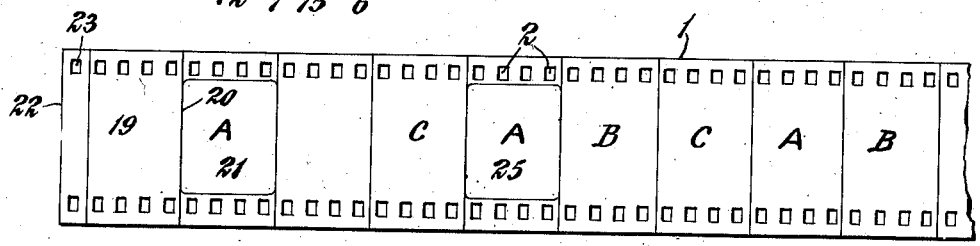
Fig. 5
INVENTOR.
BY Earl Rossman
ATTORNEY.

Patented May 17, 1938

2,117,910

UNITED STATES PATENT OFFICE 2,117,910

STEREOSCOPIC VIEWER AND PHOTOGRAPHIC FILM FOR SAME

Earl Rossman, New York, N. Y., assignor to Novelview, Inc., New York, N. Y., a corporation of New York Application August 10, 1935, Serial No. 35,556

2 Claims. (Cl. 88—31)

This invention relates to hand-held stereoscopic viewers of the type wherein there is utilized a perforated film tape having therealong a series of pairs of stereoscopic images. The viewing device embodies a pair of binoculars and windows, and the film is threaded through a framing of the device to bring said images in registry with the windows.

One of the objects of the invention is to provide an economically manufacturable and salable, efficiently utilizable and operable, and improved device wherewith to view stereoscopic pictures upon a film tape.

Another object is to provide a device of the above type having improved means for propelling and resting said film tape while viewing the pictures.

A further object is to provide a device of the above type having means for propelling and resting the film tape in either of opposite directions, so as to readily and conveniently select any picture along the film for viewing.

A further object is to provide a device of the said type with improved means for positively registering any complementary pair of the images with said windows.

A still further object is to provide a device and film of this type with means to automatically produce registration of the leading complementary pair of the images with said windows upon the threading of the leading end of the film through the device.

Other objects and advantages will hereinafter appear.

In the accompanying drawing,—

Fig. 1 shows a plan view of the stereoscopic viewer of this invention.

Fig. 2 is a cross-sectional elevation of the viewing device shown in Fig. 1, on line 2—2.

Fig. 3 is a transverse-sectional side elevation of the viewing device shown in Fig. 2, on line 3—3.

Fig. 4 is a cross-sectional plan view showing a detail of the viewing device.

Fig. 5 is a plan view of a stereoscopic image film of this invention.

The film 1, Fig. 5, is preferably of standard cinematic dimensions, with standard perforations 2, and has printed therealong a plurality of photographic complementary pairs of stereoscopic images A, B, C, as shown. The viewing device 3 is provided with a framing 4 for receiving the film 1, binoculars 5 project from said framing, and windows 6 are formed in said framing opposite to the said binoculars. In the hubbed portion 7 of the framing 4 is rotatably mounted a gear 8 of sixteen teeth 9 adapted to engage and mesh with the perforations 2 of the film, serving as a rack. The gear 8 is keyed upon an axle 10 journaled in the hub 7 and terminating in a knurled finger-knob 11. The framing 4 for guiding the film consists of a bottom plate 12 and a plate 13 thereover, which is provided with rounded edges 14 at its ends and at the window-openings 6 to facilitate threading of the film through the framing. The window-openings in plate 12 are preferably rabbeted as shown and filled with suitable panes 15 of translucent light dispersing material. Between the gear 8 and the wall of hub 7 is located a yieldable spring plate 16 having a pair of projections 17, which continually bear pressingly against the gear, Figs. 3, 4, there thus being one such projection for each eight teeth of the gear, and the latter is provided with a pair of openings 18 adapted to receive and register with said projections when the gear is turned to bring the openings into alignment with the projections. Due to this mechanism, the gear 8 is capable of rotating freely during a fractional revolution thereof equal to a peripheral extent of eight of its teeth, but will be yieldingly arrested between said fractional turns.

When the film 1 is propelled through the framing 4 any pair of its complementary images A, B, C may be brought into registry with the windows 6 and the stereoscopic pictures thus viewed. The image areas are so arranged upon the film that between the units comprising each complementary pair thereof are located two similar areas belonging to different pairs of images, and it is required that the film be advanced to a distance of two of the areas in order to bring the succeeding picture to view. At each of the images is formed a multiple of four perforations 2 comprising the continuity of the perforation-rack, as shown, and as each peripheral portion of gear 8, between its openings 18, includes eight teeth the free fractional turns of the gear will advance the film to bring complementary pairs of the images in registry with windows 6, and will yieldingly arrest the pictures when the openings 18 of gear 8 come into engagement with the projections 17 of spring-plate 16. Continuing the rotation of the gear 8 in either direction, therefore, will bring to view any pair of its stereoscopic images, which may be left stationary for viewing at the yieldingly arrested position of the gear, and the film may be also advanced through the frame 4, by merely drawing upon either extension 1a, Fig. 2, thereof, in which case the gear 8 meshing with the film perforations will bring a complementary pair of images into registry with the windows 6 at each engagement of the holes 18 with the projections 17, provided any one pair of the images has been initially in such registry while said openings and projections were in engagement.

As shown in Fig. 5, the initial end of the film 1 is provided with a marginal portion 19 between the edge 20 of the first image area 21 and the terminal edge 22 of the film, and the distance between edge 22 and the last perforation 23 is also predeterminately fixed. When it is desired to feed this film in the viewing device, the gear 8 is first placed by its knob 11 in the arrested position, viz, with the openings 18 and projections 17 in yieldable engagement, and then the film is inserted with its leading edge 22 through the mouth 24 of the guiding track and fed forwardly. Thereupon the film-edge 22 strikes the vertically projecting tooth 9a of the gear, and rotating the latter causes the adjacent tooth 9b to enter the leading perforation 23 and thereby enmeshes the gear with the film. The continued forward feeding of the film and resulting rotation of gear 8 causes the initial complementary images 21, 25 to register with the windows 6 upon the first "click" or engagement of the openings 18 with the projections 17, and the automatic registering of all the other stereoscopic pictures of the film with the windows is thereby effected upon the arresting periods of gear 8 or resting periods of the film, whether the latter is fed by turning the knob 11 or drawing at either end of the film, to view the pictures successively or selectively in either direction.

Variations may be resorted to within the scope of the invention, and portions of the improvements may be used without others.

Having thus described my invention, I claim:—

1. A viewing device with a perforated film tape therefor having thereupon a series of ocularly spaced complementary stereoscopic images, the device including binoculars with ocularly spaced windows for registering with said images, the device being adapted for threading the film therethrough, a toothed gear rotatably mounted in the device for meshing with the film perforations, means to arrest the rotation of said gear at peripheral distances equal to the distances required to advance the film to bring succeeding complementary stereoscopic images into registry with said windows, said film being provided with a predetermined terminal edge at such distance from the leading perforation thereof that when threaded through the device said edge will actuate one tooth of the gear to cause the succeeding tooth to enmesh with said leading perforation, and said predetermined edge being also at such distance from its leading pair of stereoscopic images that when enmeshing the film with the gear while it is in said arrested position it will bring the leading pair of complementary images in registery with said windows upon the succeeding arrested position of the gear.

2. A viewing device with a perforated film tape therefor having thereupon a series of ocularly spaced complementary stereoscopic images, the device including binoculars with ocularly spaced windows for registering with said images, the device being adapted for threading the film therethrough, a toothed gear rotatably mounted in the device for meshing with the film perforations, means to arrest the rotation of said gear at peripheral distances equal to the distances required to advance the film to bring succeeding complementary stereoscopic images into registry with said windows, and said film being provided with a predetermined terminal edge at such distance from its leading pair of stereoscopic images that when threaded through the device and enmeshing the film with the gear while it is in said arrested position it will bring the leading pair of complementary images in registry with said windows upon the succeeding arrested position of the gear.

EARL ROSSMAN.